United States Patent
Choi et al.

(10) Patent No.: US 12,335,269 B2
(45) Date of Patent: *Jun. 17, 2025

(54) ACCESS MANAGEMENT SYSTEM AND ACCESS MANAGEMENT METHOD

(71) Applicant: SUPREMA INC., Seongnam-si (KR)

(72) Inventors: Seong Bin Choi, Seongnam-si (KR); Young Soo Moon, Seoul (KR)

(73) Assignee: SUPREMA INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,707

(22) Filed: Jan. 30, 2024

(65) Prior Publication Data

US 2024/0205223 A1     Jun. 20, 2024

Related U.S. Application Data

(63) Continuation of application No. 17/901,712, filed on Sep. 1, 2022, now Pat. No. 11,888,852, which is a (Continued)

(30) Foreign Application Priority Data

Jan. 2, 2019     (KR) .................... 10-2019-0000384

(51) Int. Cl.
*G06F 7/04*     (2006.01)
*H04L 9/40*     (2022.01)

(52) U.S. Cl.
CPC ........ *H04L 63/101* (2013.01); *H04L 63/0442* (2013.01); *H04L 63/083* (2013.01); *H04L 63/0876* (2013.01)

(58) Field of Classification Search
CPC ...... G06F 21/305; G06F 21/335; G06F 21/44; G06F 21/606; G06F 21/604; H04L 9/08;
(Continued)

(56) References Cited

U.S. PATENT DOCUMENTS 9,473,941 B1 *   10/2016   Palin ................... H04W 12/069
9,711,048 B1 *   7/2017   Knas ..................... G08G 1/144
(Continued)

FOREIGN PATENT DOCUMENTS

CN          106097492 A     11/2016
EP          2894609 A1     7/2015
(Continued)

OTHER PUBLICATIONS

Karani et al, Implementation and Design Issues for Using Bluetooth Low Energy in Passive Keyless Entry Systems, Dec. 18, 2016, IEEE, pp. 1-6. (Year: 2016).*

(Continued)

*Primary Examiner* — Philip J Chea
*Assistant Examiner* — Jenise E Jackson
(74) *Attorney, Agent, or Firm* — Maschoff Brennan

(57) ABSTRACT

According to one embodiment of the present application, provided is an access management method of an access control device, comprising the steps of: receiving, from a user terminal, a first advertising packet including open authentication information; generating a key on the basis of at least a first random key; confirming the open authentication information on the basis of the generated key; and determining the opening of a door on the basis of the open authentication information.

16 Claims, 12 Drawing Sheets

Related U.S. Application Data continuation of application No. 17/365,809, filed on Jul. 1, 2021, now Pat. No. 11,470,087, which is a continuation of application No. PCT/KR2019/018186, filed on Dec. 20, 2019.

(58) Field of Classification Search
CPC ... H04L 9/0816; H04L 9/0819; H04L 9/0825; H04L 9/0861; H04L 63/0428; H04L 63/0435; H04L 63/06; H04L 63/062; H04L 63/065; H04L 63/0876; H04L 63/10; H04L 63/101; H04L 63/0442; H04L 63/083

See application file for complete search history.

(56) References Cited

U.S. PATENT DOCUMENTS

| | | | |
|---|---|---|---|
| 10,657,744 B2 | 5/2020 | Ruggieri et al. | |
| 10,659,961 B2* | 5/2020 | Zimmerman | H04L 9/0827 |
| 2005/0059430 A1* | 3/2005 | Beeman | H04M 3/42178 |
| | | | 455/466 |
| 2009/0217027 A1 | 8/2009 | Ayalon | |
| 2012/0047262 A1* | 2/2012 | Laarakkers | H04W 12/06 |
| | | | 709/225 |
| 2012/0143758 A1 | 6/2012 | Anantha | |
| 2014/0019768 A1 | 1/2014 | Pineau et al. | |
| 2014/0064486 A1* | 3/2014 | Abraham | H04W 12/03 |
| | | | 380/270 |
| 2014/0188348 A1* | 7/2014 | Gautama | B60W 10/30 |
| | | | 701/48 |
| 2014/0293754 A1* | 10/2014 | Jang | G08C 23/02 |
| | | | 367/199 |
| 2015/0049871 A1* | 2/2015 | Xie | H04W 12/04 |
| | | | 380/270 |
| 2015/0199859 A1* | 7/2015 | Ouyang | H04L 9/30 |
| | | | 340/5.61 |
| 2017/0064491 A1* | 3/2017 | Mirza | H04L 43/106 |
| 2017/0127222 A1* | 5/2017 | Lang | H04W 52/30 |
| 2017/0372600 A1 | 12/2017 | Palin et al. | |
| 2018/0083955 A1 | 3/2018 | Tuli et al. | |
| 2018/0114387 A1 | 4/2018 | Klink et al. | |
| 2018/0176776 A1* | 6/2018 | Knaappila | H04W 4/80 |
| 2019/0197471 A1* | 6/2019 | Endo | G06F 9/541 |
| 2019/0259233 A1* | 8/2019 | Lee | G07C 9/00817 |
| 2019/0364022 A1 | 11/2019 | Narendra et al. | |
| 2019/0371105 A1 | 12/2019 | Ye | |
| 2020/0053831 A1 | 2/2020 | Park et al. | |
| 2020/0265288 A1 | 8/2020 | Volkerink et al. | |

FOREIGN PATENT DOCUMENTS

| | | |
|---|---|---|
| JP | 2010-022010 A | 1/2010 |
| KR | 10-2010-0063156 A | 6/2010 |
| KR | 10-2015-0082862 A | 7/2015 |
| KR | 10-2015-0131597 A | 11/2015 |
| KR | 10-2016-0132168 A | 11/2016 |
| KR | 10-2018-0081308 A | 7/2018 |
| KR | 10-2018-0127104 A | 11/2018 |
| WO | 2006-066378 A | 6/2006 |

OTHER PUBLICATIONS

Rehan et al, ZLS: A Next-Door Lightweight QoS Aware Location Service Technique for VANET on Highways, Jun. 5, 2014, IEEE, pp. 1-6. (Year: 2014).*

* cited by examiner

FIG. 8

| Preamble | Access Address | Header | Payload | CRC |
|---|---|---|---|---|
| 1 Byte | 4 Bytes | 2 Bytes | 0-37 Bytes | 3 Bytes |

(a)

| Preamble | Access Address | Header | Payload | MIC | CRC |
|---|---|---|---|---|---|
| 1 Byte | 4 Bytes | 2 Bytes | up to 255 Bytes (incl. MIC) | 4 Bytes | 3 Bytes |

(b)

ACCESS MANAGEMENT SYSTEM AND ACCESS MANAGEMENT METHOD

TECHNICAL FIELD

The present invention relates to an access management system and an access management method using the same.

BACKGROUND ART

In a technology for managing access to a building or a specific area, a technology for managing access by acquiring information previously stored in a user terminal and determining whether to open a door by an access management device is used.

In the technology, the user terminal is conventionally implemented as a card key or the like, but recently, has become broadly implemented as a mobile terminal such as a smart phone carried by a user.

In the access management using a mobile terminal, it takes a long time for the access management device to acquire information required for determining whether to open the door from the mobile terminal, compared to using the conventional card key, from a connection of communication to acquisition of data and to determination, and thus a user may be uncomfortable due to a sensation of delay.

Accordingly, research is being conducted on an access management system capable of opening a door using a mobile terminal to reduce the time required for a user to access and open a door.

DISCLOSURE

Technical Problem

The present invention is directed to providing an access management system and an access management method using the same that are capable of improving a discomfort that may be felt by a user, who needs to wait, due to a time taken to access and open a door because information required for authentication is acquired after a communication connection procedure between devices is completed.

Technical Solution

One aspect of the present invention provides an access management method of an access control device that performs authentication on a user terminal using an advertising packet, the access management method including: receiving a first advertising packet including open authentication information from a user terminal, the first advertising packet including a first random key used for generating a key for decrypting the open authentication information; generating the key on the basis of at least the first random key; identifying the open authentication information on the basis of the generated key; and determining the door to be opened on the basis of the open authentication information.

Another aspect of the present invention provides a method of controlling a user terminal, which allows data communication to be performed with an access control device that determines opening or closing of a door using an advertising packet, the method including: generating a first advertising packet including a first random key and open authentication information, wherein the open authentication information is encrypted data, and the first random key is used for generating a key for decrypting the open authentication information; and transmitting the first advertising packet to the access control device.

Another aspect of the present invention provides an access control device that performs authentication on a user terminal using an advertising packet, the access control device including: a communication unit; and a door control unit configured to: receive a first advertising packet including open authentication information from a user terminal, the first advertising packet including a first random key used for generating a key for decrypting the open authentication information; generate the key on the basis of at least the first random key to identify the open authentication information on the basis of the generated key; and determine the door to be opened on the basis of the open authentication information.

Advantageous Effects

According to the present inventions, since information required for user authentication for opening a door is acquired while a communication connection procedure between devices is in progress, the user's discomfort according to the time taken for the user to access and open the door can be reduced.

DESCRIPTION OF DRAWINGS

FIG. 8 is a diagram for describing a data packet according to an embodiment of the present application.

BEST MODE OF THE INVENTION

Figure 1:
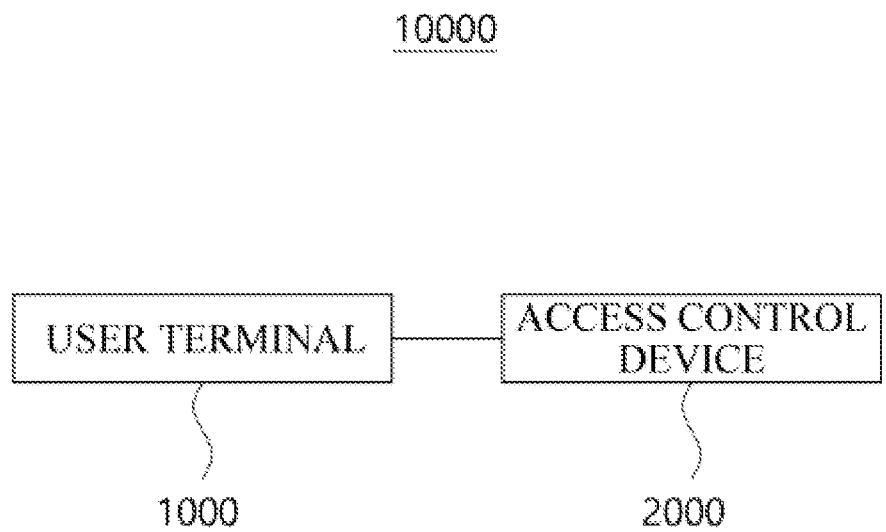
FIG. 1 is an environment diagram illustrating an access management system (10000) according to an embodiment of the present application.

According to an embodiment of the present application, an access management method of an access control device that performs authentication on a user terminal using an advertising packet may be provided, and the access management method includes: receiving a first advertising packet including open authentication information from the user terminal, the first advertising packet including a first random key used for generating a key for decrypting the open authentication information; generating the key on the basis of at least the first random key; identifying the open authentication information on the basis of the generated key; and determining the door to be opened on the basis of the open authentication information.

Modes of the Invention

The above objects, features and advantages of the present invention will become more apparent from the following detailed description taken in conjunction with the accompanying drawings. However, the present invention may be modified in various ways and may have various embodiments. Hereinafter, specific embodiments will be illustrated in the drawings and described in detail.

In the drawings, the thicknesses of layers and regions are exaggerated for the purpose of clarity. Further, when an element or layer is referred to as being "on" another element or layer, it can be directly on another element or intervening layers or elements may be present. In the following description, the same reference numerals are used to designate the same elements in principle. In addition, elements having the same function within the scope of the same idea shown in the drawings of each embodiment will be described using the same reference numerals.

In addition, when it is determined that the detailed description of the known function or configuration related to the present invention may unnecessarily obscure the subject matter of the present invention, the detailed description thereof will be omitted. In addition, numerals (e.g., first, second, etc.) used in the description of the present invention are merely an identifier for distinguishing one component from another component.

The suffixes "module" and "unit" for components used in the following description are given or used in consideration of ease of specification and do not have distinct meanings or roles from each other.

FIG. 1 is an environment diagram illustrating an access management system 10000 according to an embodiment of the present application.

Referring to FIG. 1, the access management system 10000 according to the embodiment of the present application may include a user terminal 1000 and an access control device 2000.

According to an embodiment of the present application, the access control device 2000 may receive a data packet from the user terminal 1000. According to another embodiment of the present application, the user terminal 1000 may receive a data packet from the access control device 2000. According to still another embodiment of the present application, the user terminal 1000 may transmit a data packet to the access control device 2000 and receive a data packet from the access control device 2000.

For a specific example, the access control device 2000 may receive an advertising packet from the user terminal 1000. For another specific example, the access control device 2000 may transmit an advertising packet to the user terminal 1000, and the user terminal 1000 may transmit a second advertising packet in response to the first advertising packet transmitted from the access control device 2000.

According to the embodiment of the present application, the user terminal 1000 may request the access control device 2000 to open a door. For example, the user terminal 1000 may request opening for the door by transmitting open authentication information to the access control device 2000. As another example, the user terminal 1000 may request opening for the door by transmitting open authentication information to the access control device 2000 such that the validity of the open authentication information is determined, and transmitting open request information for opening a door.

According to the embodiment of the present application, the access control device 2000 may check the validity of the open authentication information on the basis of the data packet received from the user terminal 1000 and may open the door when the user terminal 1000 that has transmitted the open authentication information is identified as having a right to open the door.

The transmission and reception of data packets between the user terminal 1000 and the access control device 2000 and specific information included in the data packets will be described in more detail below.

Figure 2:
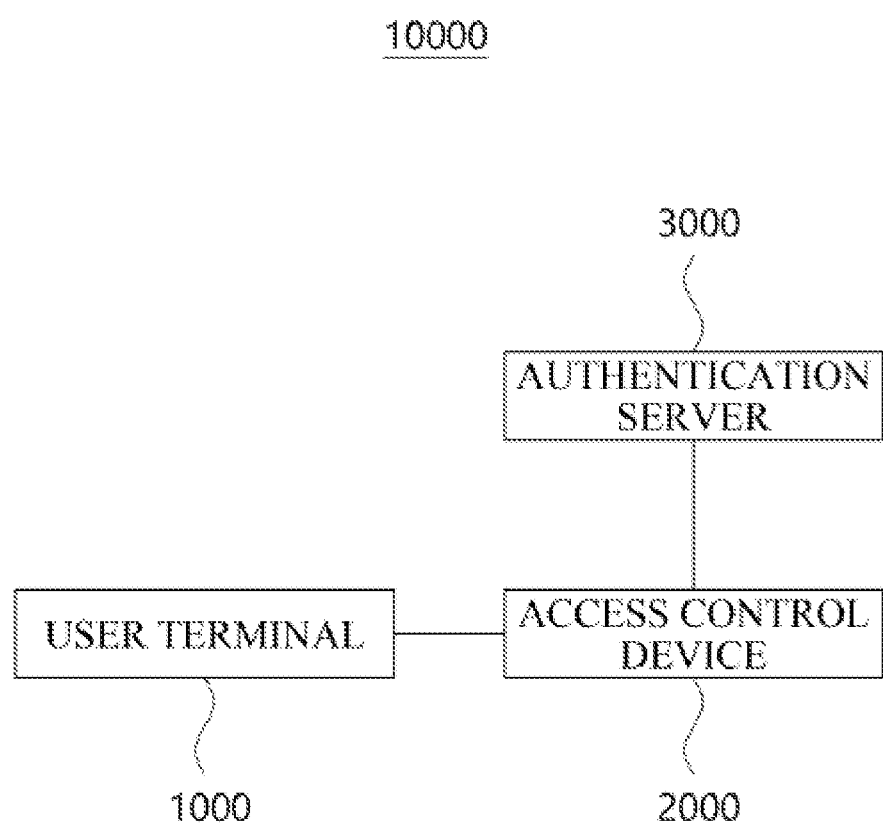
FIG. 2 is an environment diagram illustrating an access management system (10000) according to an embodiment of the present application.

FIG. 2 is an environment diagram illustrating an access management system 10000 according to an embodiment of the present application.

Referring to FIG. 2, the access management system 10000 according to the embodiment of the present application may include a user terminal 1000, an access control device 2000, and an authentication server 3000.

The access management system 10000 according to the embodiment of the present application disclosed in FIG. 2 performs almost the same operation as that of the access management system 10000 according to the embodiment of the present application disclosed in FIG. 1, except for further including the authentication server 3000.

Accordingly, the same operation of the access management system 10000 that has been described in FIG. 1 will be omitted in describing the embodiment described in FIG. 2, and the redundant description will be replaced using the same reference numerals.

According to the embodiment of the present application, the authentication server 3000 may be connected to the access control device 2000.

According to the embodiment of the present application, the authentication server 3000 may provide the access control device 2000 with information related to the open authentication information. The authentication server 3000 may provide the access control device 2000 with information related to the open authentication information received by the access control device 2000 from the user terminal 1000. The authentication server 3000 may provide the access control device 2000 with information for checking the validity of the open authentication information.

According to the embodiment of the present application, the access control device 2000 may request the authentication server 3000 to transmit the information related to the open authentication information. The access control device 2000 may request the authentication server 3000 to transmit the information for checking the validity of the open authentication information.

The transmission and reception of data packets between the user terminal 1000, the access control device 2000, and the authentication server 3000 and specific information included in the data packets will be described in more detail below.

Figure 3:
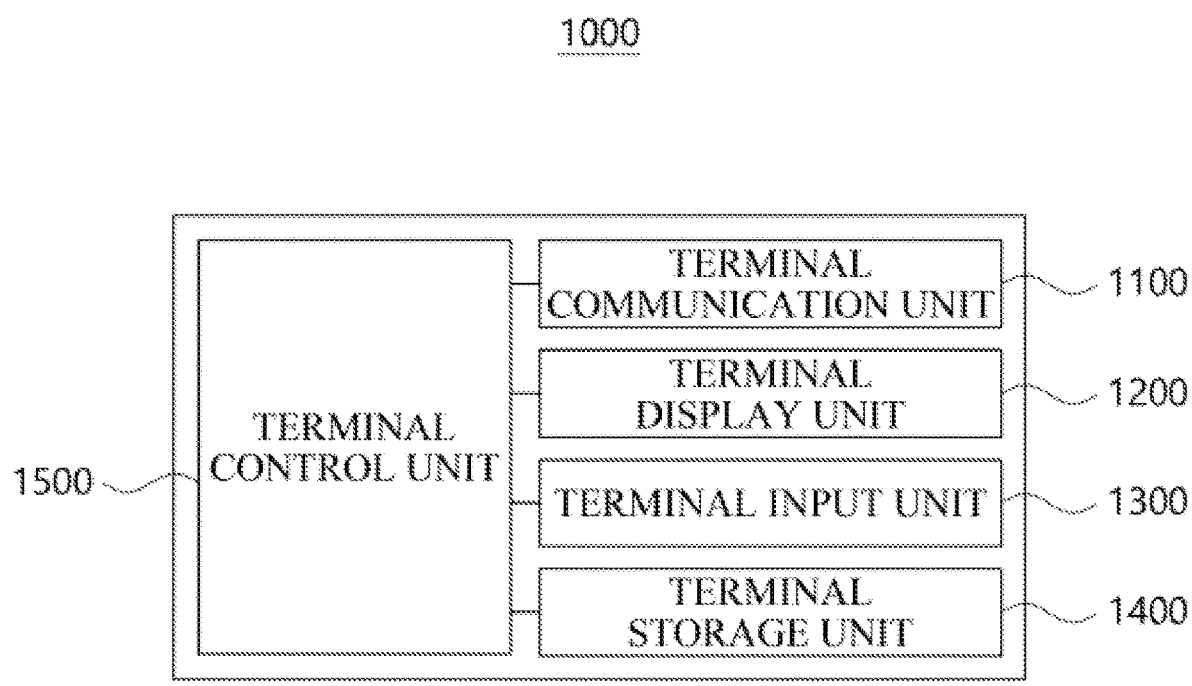
FIG. 3 is a block diagram illustrating a user terminal (1000) according to an embodiment of the present application.

FIG. 3 is a block diagram illustrating a user terminal 1000 according to an embodiment of the present application.

Referring to FIG. 3, the user terminal 1000 may include a terminal communication unit 1100, a terminal display unit 1200, a terminal input unit 1300, a terminal storage unit 1400, and a terminal control unit 1500.

The terminal communication unit 1100 may connect the user terminal 1000 to an external electronic device. For example, the terminal communication unit 1100 may connect the user terminal 1000 to an external electronic device such as the access control device 2000 and the like.

The terminal communication unit 1100 may be a communication module supporting wired and/or wireless communication. The terminal communication unit 1100 may be implemented as a wired connector, a communication chip, or a communication module.

The terminal communication unit 1100 according to the embodiment of the present application may include a communication interface for performing Bluetooth Low Energy (BLE) communication. For example, the terminal communication unit 1100 may perform transmission of an advertising packet before BLE communication connection. As another example, the terminal communication unit 1100 may transmit a first advertising packet before a BLE communication connection and, upon receiving a second advertising packet transmitted in response to the first advertising packet, transmit a connection request for a connection of BLE communication.

The terminal display unit 1200 may output visual information. The terminal display unit 1200 may be implemented as a display panel or the like.

According to the embodiment of the present application, when the terminal display unit 1200 is provided as a touch screen, the terminal display unit 1200 may perform the function of the terminal input unit 1300. In this case, depending on the selection, the user terminal 1000 may not be provided with a separate terminal input unit 1300.

The terminal input unit 1300 may acquire a signal corresponding to a user's input. The terminal input unit 1300 may be implemented as, for example, a keyboard, a keypad, a button, a jog shuttle, a wheel, or a display panel.

The terminal storage unit 1400 may store data. The terminal storage unit 1400 may store data required for the operation of the user terminal 1000. The terminal storage unit 1400 may be implemented as a flash memory, a random-access memory (RAM), a read-only memory (ROM), a solid-state drive (SSD), a secure digital (SD) card or an optical disk.

The terminal storage unit 1400 according to the embodiment of the present application may store data required for generating open authentication information. The data required for generating the open authentication information may be identification information of the access control device 2000, user identification information associated with the access control device 2000, identification information of the user terminal 1000, a personal identification number (PIN), and/or a password. The data required for generating the open authentication information may be information and/or setting information required for encryption of the open authentication information.

The terminal control unit 1500 may perform overall operations of the user terminal 1000. The terminal control unit 1500 may be implemented in the form of a central processing unit (CPU) or a controller.

Figure 4:
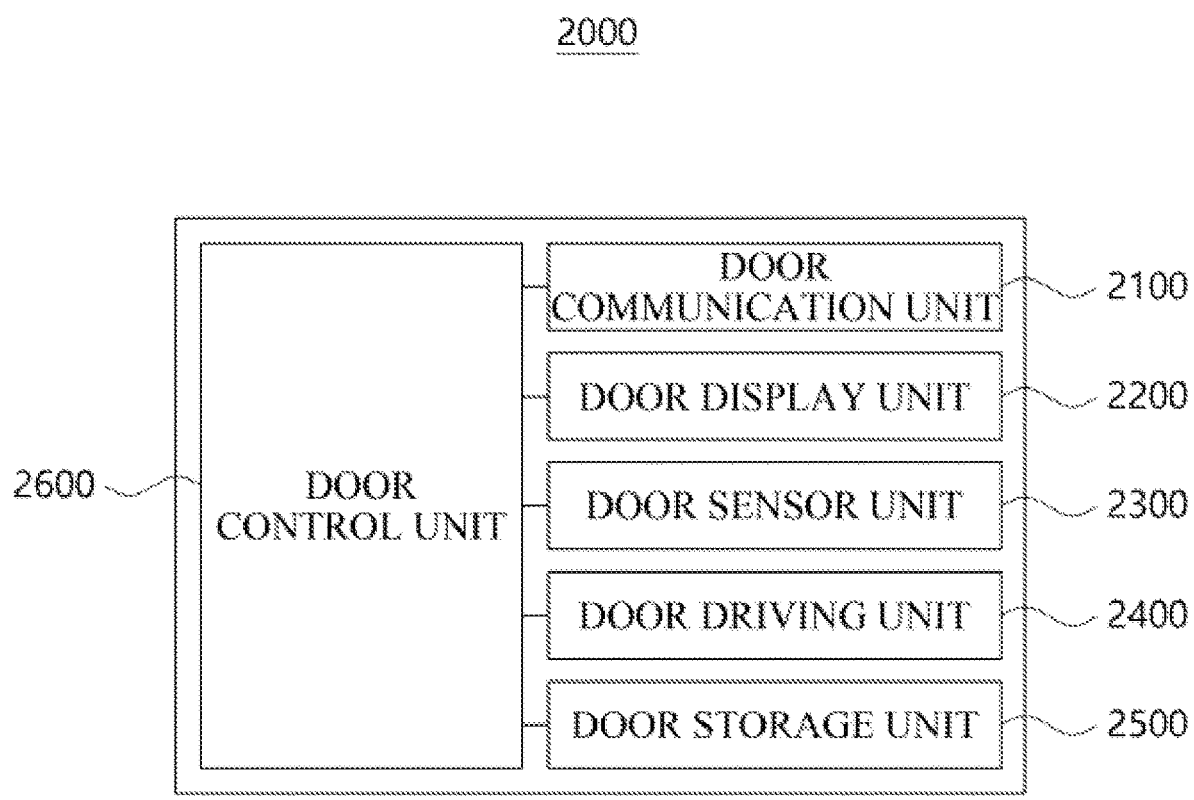
FIG. 4 is a block diagram illustrating an access control device (2000) according to an embodiment of the present application.

FIG. 4 is a block diagram illustrating an access control device 2000 according to an embodiment of the present application.

Referring to FIG. 4, the access control device 2000 includes a door communication unit 2100, a door display unit 2200, a door sensor unit 2300, a door driving unit 2400, a door storage unit 2500, and a door control unit 2600.

The door communication unit 2100 may connect the access control device 2000 to an external electronic device. For example, the door communication unit 2100 may connect the access control device 2000 to an external electronic device such as the user terminal 1000 and the like.

The door communication unit 2100 may be a communication module supporting wired and/or wireless communication. The door communication unit 2100 may be implemented as a wired connector, a communication chip, or a communication module. For a more specific example, the door communication unit 2100 may be a communication module capable of acquiring data from the user terminal 1000.

The door communication unit 2100 according to some embodiments of the present application may include a communication module capable of receiving an advertising packet. For a more specific example, the door communication unit 2100 may include an interface that communicates through a Bluetooth or BLE method.

For example, the door communication unit 2100 may include a communication interface for performing BLE communication, and the door communication unit 2100 may receive an advertising packet from the terminal communication unit 1100 before a BLE communication connection. As another example, the door communication unit 2100 may include a communication interface for performing BLE communication, and the door communication unit 2100 may, before a BLE communication connection, transmit an advertising packet and receive an advertising packet transmitted in response to the advertising packet.

The door display unit 2200 may output visual information. The door display unit 2200 may be implemented as a display panel or the like. When the door display unit 2200 includes a touch panel, the door display unit 2200 may also operate as an input device based on a touch input.

The door sensor unit 2300 may acquire a signal related to an open state of the door. The door sensor unit 2300 may be implemented as an infrared sensor, an optical sensor, or a magnetic sensor.

According to the embodiment of the present application, the door sensor unit 2300 may acquire a signal required for determining the state of the door. The door sensor unit 2300 may acquire a signal required for determining the state of the door and transmit the acquired signal to the door control unit 2600.

The door driving unit 2400 may provide power required for opening or closing the door. The door driving unit 2400 may control a locking device provided on a door to open or close the door, and the door driving unit 2400 may provide the locking device with power required for controlling the locking device.

The door storage unit 2500 may store a program for performing a control operation of the door control unit 2600 and may store data received from an external device and data generated from the door control unit 2600.

The door storage unit 2500 may be implemented as a flash memory, a RAM, a ROM, an SSD, an SD card, or an optical disk.

The door storage unit 2500 according to the embodiment of the present application may store data required for checking the validity of open authentication information. The data required for checking the validity of the open authentication information may be information for checking whether the user terminal 1000 that has transmitted the open authentication information has a right to access the door. The data required for checking the validity of the open authentication information may be identification information of a user, identification information of the user terminal 1000, a PIN, and/or a password.

The door storage unit 2500 according to the embodiment of the present application may store a private key and a public key corresponding to the private key.

The door control unit 2600 controls the overall operation of the access control device 2000. The door control unit 2600 may be implemented in the form of a CPU or a controller.

According to the embodiment of the present application, the door control unit 2600 may determine whether to open the door on the basis of data received through the door communication unit 2100. Upon determining the door to be opened, the door control unit 2600 controls the door driving unit 2400 to open the door.

Figure 5:
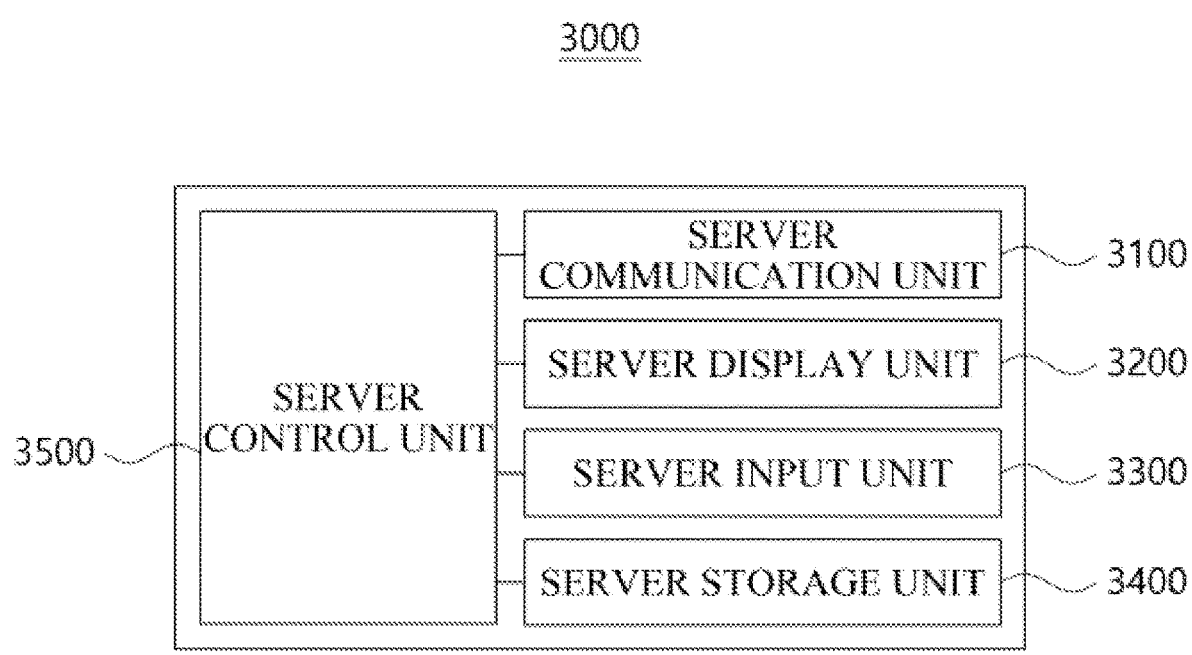
FIG. 5 is a block diagram illustrating an authentication server (3000) according to an embodiment of the present application.

FIG. 5 is a block diagram illustrating an authentication server 3000 according to an embodiment of the present application.

Referring to FIG. 5, the authentication server 3000 may include a server communication unit 3100, a server display unit 3200, a server input unit 3300, a server storage unit 3400, and a server control unit 3500.

The server communication unit 3100 may connect the server device 3000 to an external electronic device. For example, the server communication unit 3100 may connect the authentication server 3000 to an external electronic device such as the access control device 2000 or the like.

The server communication unit 3100 may be a communication module supporting at least one of a wired communication method and a wireless communication method. The server communication unit 3100 may be implemented as a wired connector, a communication chip, or a communication module.

The server display unit 3200 may output visual information. For example, the server display unit 3200 may be implemented as a display panel or the like.

The server input unit 3300 may acquire a signal corresponding to a user's input. The server input unit 3300 may be implemented as, for example, a keyboard, a keypad, a button, a jog shuttle, a wheel, or a display panel.

The server storage unit 3400 may store data. The server storage unit 3400 may store data required for the operation of the authentication server 3000. The terminal storage unit 1400 may be implemented as a flash memory, a RAM, a ROM, an SSD, an SD card, or an optical disk.

According to the embodiment of the present application, the server storage unit 3400 may store authentication information associated with the access control device 2000. According to the embodiment of the present application, the server storage unit 3400 may store a program required for the operation of the authentication server 3000.

The server control unit 3500 may perform the overall operation of the server device 3000. The server control unit 3500 may be implemented in the form of a CPU or a controller.

In the above, each component included in the user terminal 1000, the access control device 2000, and the authentication server 3000 has been described in detail. However, the user terminal 1000, the access control device 2000, and the authentication server 3000 according to the present application do not need to include all of the above-described components, and some components may be excluded or added according to the selection.

Hereinafter, an operation in the access management system 10000 including at least the user terminal 1000 and the access control device 2000 will be described in detail.

In describing the access management system 10000, the description may be developed in a form in which the access management system 10000 includes the user terminal 1000 and the access control device 2000, or in a form in which the access management system 10000 includes the user terminal 1000, the access control device 2000, and the authentication server 3000.

However, this is only to describe an embodiment assuming for convenience of description, and in interpreting the scope of the present invention, it should be interpreted according to the principle of interpretation of the claims and should not be limited.

In the access management system disclosed in the present application, the opening of the door may be controlled using data transmitted/received before a communication connection is established between the user terminal 1000 and the access control device 2000. In the case of controlling the opening of the door using data transmitted/received before the communication connection is established between the user terminal 1000 and the access control device 2000, there is a benefit of resolving a discomfort felt by a user due to a time taken for the connection between the user terminal 1000 and the access control device 2000.

Figure 6:
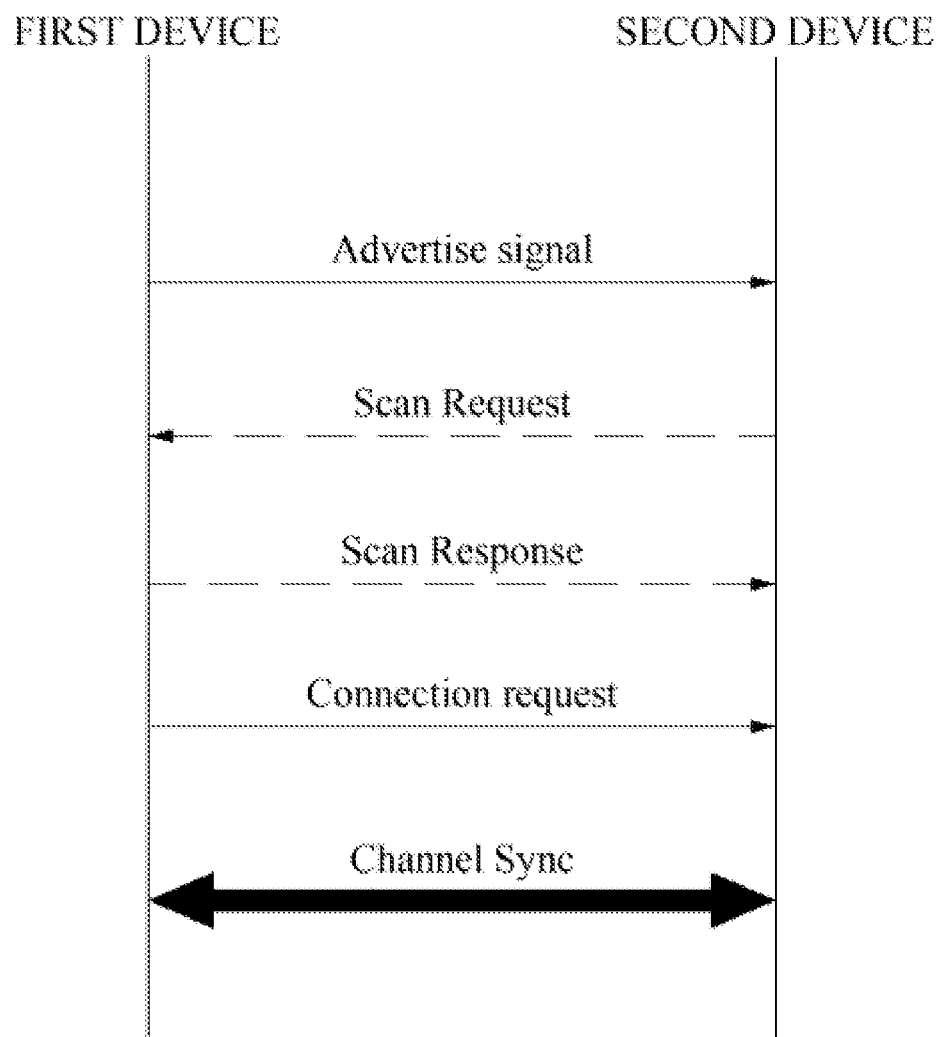
FIG. 6 is a diagram for describing a communication connection between devices in a Bluetooth Low Energy (BLE) method.

FIG. 6 is a diagram for describing a communication connection between devices in a BLE method.

The BLE communication connection disclosed herein may refer to an operation of establishing a communication channel through frequency synchronization between a first device and a second device. Before the BLE communication connection is established, data transmission/reception between devices may be performed in order to perform the communication connection.

More specifically, before the communication connection is established between the first device and the second device, the first device may transmit an advertising packet to the second device.

Since frequency synchronization between the first device and the second device is not performed before the communication connection is established between the first device and the second device, the first device and the second device may be in a state of changing a data transmission path to 2402 MHz, 2426 MHz or 2480 MHz through frequency hopping.

The advertising packet transmitted from the first device to the second device may be an advertising signal. A method of transmitting the advertising signal to the second device by the first device may be in the form of broadcasting.

As described above, the first device may transmit data through at least one of frequency bands of 2402 MHz, 2426 MHz, and 2480 MHz. In this case, the first device may be an advertiser.

The second device may perform scanning at preset time intervals. The second device may be in a state of changing the data reception path to 2402 MHz, 2426 MHz or 2480 MHz through frequency hopping to receive data transmitted at 2402 MHz, 2426 MHz or 2480 MHz.

The second device may receive the advertising signal transmitted from the first device. The second device may receive data from the first device through one of frequency bands of 2402 MHz, 2426 MHz, and 2480 MHz. In this case, the second device may be a scanner.

Although not essential, the second device that has received the advertising signal from the first device may transmit an advertising packet to the first device. The advertising packet transmitted from the second device to the first device may be a scan request. The second device that has received the advertising signal from the first device may transmit the scan request to the first device to request required information.

The first device that has received the scan request from the second device may forward an advertising packet to the second device. The advertising packet transmitted from the first device to the second device may be a scan response.

The first device having confirmed the existence of the second device may request a connection to the second device. In other words, the advertiser may request a connection to the scanner. Alternatively, the second device may request a connection to the first device. The scanner may request a connection to the advertiser.

After a connection is requested from one side, when a communication connection is established between the first device and the second device, a data transmission/reception frequency may be synchronized between the first device and the second device. The first device and the second device may share information about the data transmission/reception frequency and frequency hopping timing.

In this way, security is reinforced, and bytes of data that may be transmitted may be increased.

According to the embodiment of the present application, an authentication procedure for controlling the access management system 10000 may be performed using such an advertising packet transmitted/received before the BLE communication connection described above is established.

Figure 7:
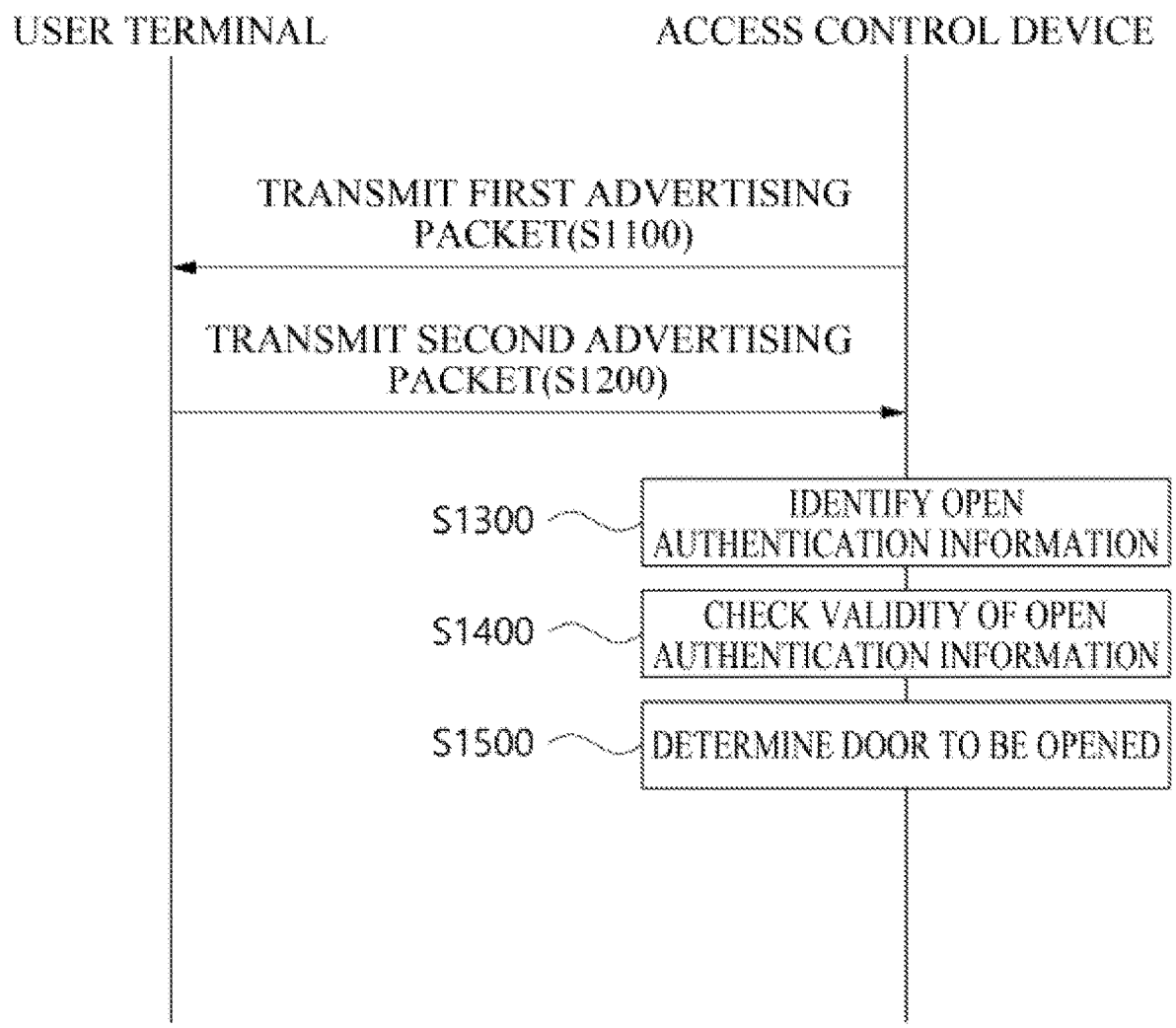
FIG. 7 is a diagram for describing an operation of an access management system 10000 that performs authentication on a user terminal (1000) using an advertising packet according to an embodiment of the present application.

FIG. 7 is a diagram for describing an operation of an access management system 10000 that performs authentication on a user terminal 1000 using an advertising packet according to an embodiment of the present application.

The access control device 2000 may transmit a first advertising packet to the user terminal 1000 (S1100). The first advertising packet may be transmitted in a broadcast form. The access control device 2000 may, while switching a data transmission path to a first, second, or third frequency band, transmit the first advertising packet in one of the first, second, and third frequency bands. For example, the first, second, and third frequency bands may be 2402 MHz, 2426 MHz, and 2480 MHz, respectively.

The first advertising packet may include a first random key. The first advertising packet may include identification information of the access control device 2000. The first advertising packet may include at least one of a first random key and identification information of the access control device 2000.

According to the embodiment of the present application, the identification information of the access control device 2000 may be encrypted, and the first random key may be used for generating a key for decrypting the encrypted identification information of the access control device 2000.

According to the embodiment of the present application, open authentication information to be described below may be encrypted, and the first random key may be used for generating a key for decrypting the encrypted open authentication information.

Referring to FIG. 8A, data included in a payload of the first advertising packet may not exceed 38 bytes. For example, the first random key and the identification information of the access control device 2000 included in the first advertising packet may not exceed 38 bytes.

The user terminal 1000 may perform scanning. The user terminal 1000 may, while switching the data reception path to the first, second, or third frequency band, receive the first advertising packet through one of the first, second, and third frequency bands. For example, the first, second, and third frequency bands may be 2402 MHz, 2426 MHz, and 2480 MHz, respectively.

The user terminal 1000 that has received the first advertising packet may transmit a second advertising packet (S1200). For example, the second advertising packet may be in the form of a scan request.

According to the embodiment of the present application, the user terminal 1000 that has received the first advertising packet may transmit a second advertising packet to the access control device 2000 (S1200). The user terminal 1000 may transmit the second advertising packet through the data transmission path through which the first advertising packet has been received.

The second advertising packet may include a second random key. The second advertising packet may include open authentication information. The second advertising packet may include at least one of a second random key and open authentication information.

The open authentication information may include information provided to open the door. For example, the open authentication information may include at least one of user identification information, identification information of the user terminal 1000, a PIN, and a password.

According to the embodiment of the present application, the open authentication information may be encrypted, and the second random key may be used for generating a key for decrypting the encrypted open authentication information.

According to the embodiment of the present application, the second advertising packet may further include the first random key. The second advertising packet may include the first random key, the second random key, and the open authentication information, and the key for decrypting the encrypted open authentication information may be generated on the basis of the first random key and the second random key.

Referring to FIG. 8A, data included in a payload of the second advertising packet may not exceed 38 bytes. For example, the second random key and the open authentication information included in the second advertising packet may not exceed 38 bytes. As another example, the first random key, the second random key, and the open authentication information included in the second advertising packet may not exceed 38 bytes.

The access control device 2000, upon receiving the second advertising packet including the open authentication information from the user terminal 1000, may identify the open authentication information (S1300).

The access control device 2000 may generate a key for decrypting the open authentication information on the basis of at least the second random key. According to the embodiment of the present application, the access control device 2000 may generate the key for decrypting the open authentication information on the basis of the second random key. According to the embodiment of the present application, the access control device 2000 may generate the key for decrypting the open authentication information on the basis of the first random key and the second random key.

The access control device 2000 may identify the open authentication information on the basis of the generated key.

In other words, the access control device 2000 may read the open authentication information by decrypting the open authentication information.

The access control device 2000 may check the validity of the open authentication information (S1400).

According to the embodiment of the present application, the access control device 2000 may compare authentication information stored in the access control device 2000 with the open authentication information to check the validity of the open authentication information. The door control unit 2600 may compare the authentication information stored in the door storage unit 2500 with the open authentication information to check the validity of the open authentication information.

According to the embodiment of the present application, the access control device 2000 may compare authentication information received from the authentication server 3000 with the open authentication information to check the validity of the open authentication information.

The authentication information may be information for checking the validity of the open authentication information. For example, the authentication information may include at least one of user identification information, identification information of the user terminal 1000, a PIN, and a password.

According to another embodiment, the access control device 2000 may transmit a first advertising packet to the user terminal 1000 (S1100). The first advertising packet may be transmitted in a broadcast form. The access control device 2000 may, while switching a data transmission path to a first, second, or third frequency band, transmit the first advertising packet in one of the first, second, and third frequency bands. For example, the first, second, and third frequency bands may be 2402 MHz, 2426 MHz, and 2480 MHz, respectively.

The first advertising packet may include a public key. The public key included in the first advertising packet may be a public key corresponding to a private key stored in the access control device 2000. Alternatively, the public key included in the first advertising packet may be a public key corresponding to a private key received by the access control device 2000 from the authentication server 3000.

Referring to FIG. 8A, data included in a payload of the first advertising packet may not exceed 38 bytes. For example, the public key included in the first advertising packet may not exceed 38 bytes.

The user terminal 1000 may perform scanning. The user terminal 1000 may, while switching the data reception path to the first, second, or third frequency band, receive the first advertising packet in one of the first, second, and third frequency bands. For example, the first, second, and third frequency bands may be 2402 MHz, 2426 MHz, and 2480 MHz, respectively.

The user terminal 1000 that has received the first advertising packet may transmit a second advertising packet (S1200). For example, the second advertising packet may be in the form of a scan request.

According to the embodiment of the present application, the user terminal 1000 that has received the first advertising packet may transmit the second advertising packet to the access control device 2000 (S1200). The user terminal 1000 may transmit the second advertising packet through a data transmission path through which the first advertising packet has been received.

The second advertising packet may include open authentication information encrypted with the received public key. The open authentication information may include information provided to open the door. For example, the open authentication information may include at least one of user identification information, identification information of the user terminal 1000, a PIN, and a password.

Referring to FIG. 8A, data included in a payload of the second advertising packet may not exceed 38 bytes. For example, the open authentication information encrypted with the public key and included in the second advertising packet may not exceed 38 bytes.

The access control device 2000, upon receiving the second advertising packet including the open authentication information from the user terminal 1000, may identify the open authentication information (S1300). The access control device 2000 may check the validity of the open authentication information (S1400).

According to the embodiment of the present application, the access control device 2000 may decrypt the open authentication information on the basis of the private key. The private key may be stored in the door storage unit 2500. Alternatively, the access control device 2000 may receive the private key from the authentication server 3000 and decrypt the open authentication information using the received private key.

The access control device 2000 may determine whether to open or close the door by identifying whether the open authentication information decrypted on the basis of the private key has a right to access the door associated with the access control device 2000.

According to the embodiment of the present application, the access control device 2000 may compare authentication information stored in the access control device 2000 with the open authentication information to check the validity of the open authentication information. The comparison procedure may be performed by the door control unit 2600.

According to the embodiment of the present application, the access control device 2000 may compare authentication information received from the authentication server 3000 with the open authentication information to check the validity of the open authentication information.

The authentication information may be information for checking the validity of the open authentication information. For example, the authentication information may include at least one of user identification information, identification information of the user terminal 1000, a PIN, and a password.

According to the embodiment of the present application, the access control device 2000 may determine the door to be opened (S1500). For example, the access control device 2000 may determine that the door is opened when the open authentication information received from the user terminal 2000 matches the authentication information received from the authentication server 3000. As another example, the access control device 2000 may determine that the door is opened when the open authentication information received from the user terminal 2000 matches the authentication information stored in the door storage unit 2500.

As another example, the access control device 2000 may determine whether to open or close the door by identifying the open authentication information (S1300). The access control device 2000 may check the validity of the open authentication information on the basis of whether the open authentication information is decrypted by the private key. In other words, when a third advertising packet is decrypted by the private key, the access control device 2000 may identify that the user terminal 1000 having transmitted the third advertising packet has a right to access the door associated with the access control device 2000 and determine that the door is opened.

Figure 9:
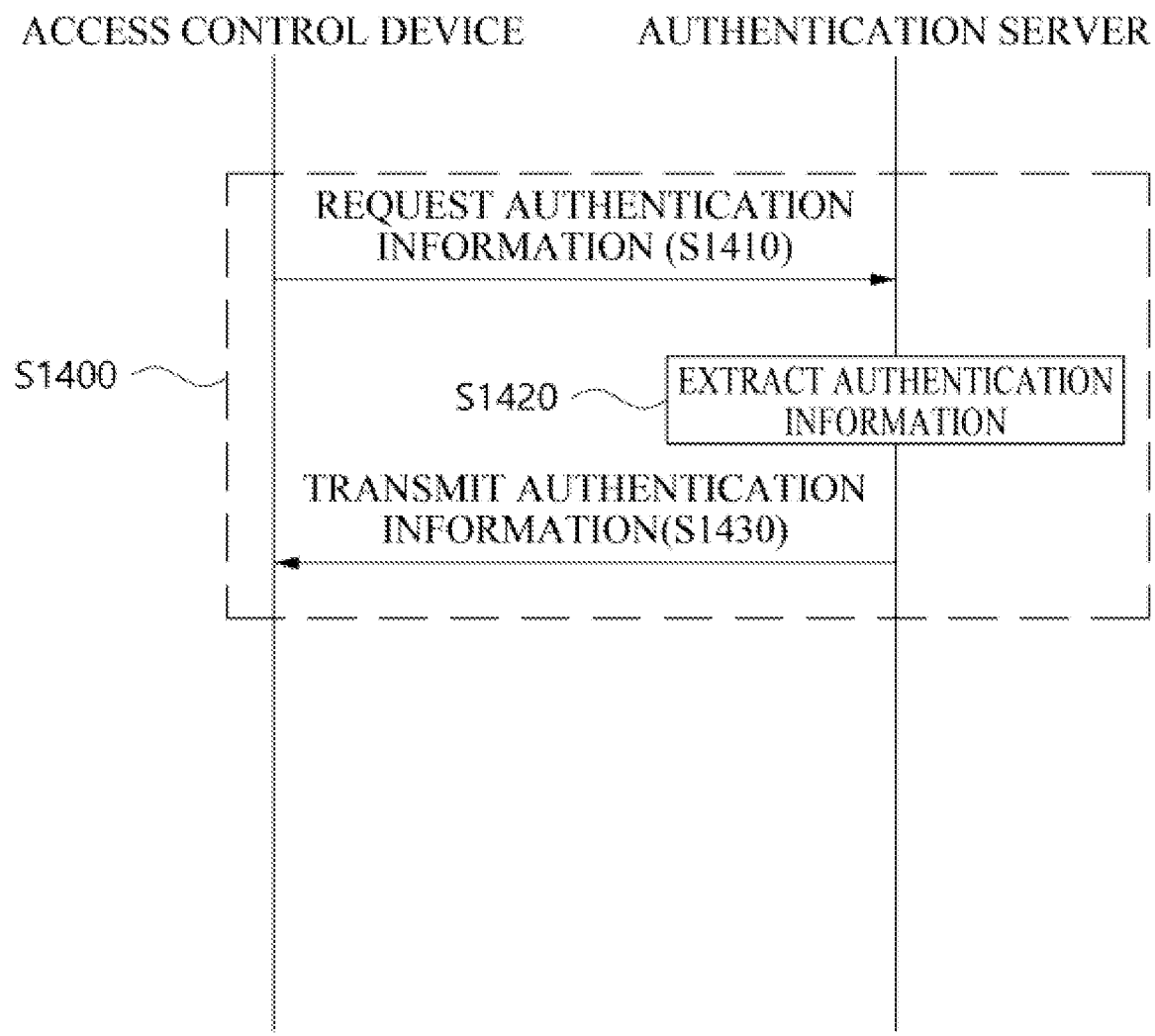
FIG. 9 is a diagram for describing an operation of transmitting authentication information between an access control device (2000) and an authentication server (3000) according to an embodiment of the present application.

FIG. 9 is a diagram for describing an operation of transmitting authentication information between an access control device 2000 and an authentication server 3000 according to an embodiment of the present application.

The access control device 2000 may, in order to check the validity of the open authentication information (S1400), request the authentication server 3000 to transmit authentication information (S1410). The authentication server 3000 may be connected to at least one access control device 2000 and may store authentication information of each door.

The authentication server 3000 may extract authentication information corresponding to the access control device 2000 that has transmitted the request (S1410) for the authentication information from pre-stored data on authentication information (S1420). The authentication server 3000 may transmit the extracted authentication information to the access control device 2000 (S1430).

In this manner, the access control device 2000 may receive the authentication information for checking the validity of the open authentication information from the authentication server 3000 and may compare the received authentication information with the open authentication information.

Subsequent to FIG. 7, the access control device 2000, upon checking the validity of the open authentication information in S1400, may determine the door to be opened (S1500). For example, the access control device 2000 may compare previously stored authentication information with the identified open authentication information, and when the authentication information matches the open authentication information, determine that the door is opened. As another example, the access control device may compare authentication information received from the authentication server 3000 with the identified open authentication information, and when the authentication information matches the open authentication information, may determine that the door is opened.

Although not an essential procedure, the user terminal 1000 may, after the transmission of the second advertising packet in S1200, communicatively connect to the access control device 2000. In other words, after the transmission of the second advertising packet in S1200, a communication channel may be established between the user terminal 1000 and the access control device 2000 through frequency synchronization.

When the user terminal 1000 and the access control device 2000 are communicatively connected to each other, a packet in the form shown in FIG. 8B may be transmitted and received between the user terminal 1000 and the access control device 2000.

In the access management system 10000 according to the embodiment of the present application, when large size data needs to be transmitted from the user terminal 1000 to the access control device 2000, or from the access control device 2000 to the user terminal 1000, an implementation may be provided such that user authentication for opening the door using an advertising packet is performed before a communication connection is established between the user terminal 1000 and the access control device 2000, and then the communication connection is established between the user terminal 1000 and the access control device 2000.

In the above, detailed description has been made on an operation of performing user authentication for opening the door of the access control device 2000 by operating the access control device 2000 as an advertiser and operating the user terminal 1000 as a scanner.

Hereinafter, an operation of the access management system 10000 in which the user terminal 1000 operates as an advertiser and the access control device 2000 operates as a scanner will be described in detail.

In the embodiment, the user terminal 1000, such as a mobile device, is not an agent that performs a repetitive scanning operation, and thus a benefit of reducing power consumption of the user terminal 1000 may be derived.

Figure 10:
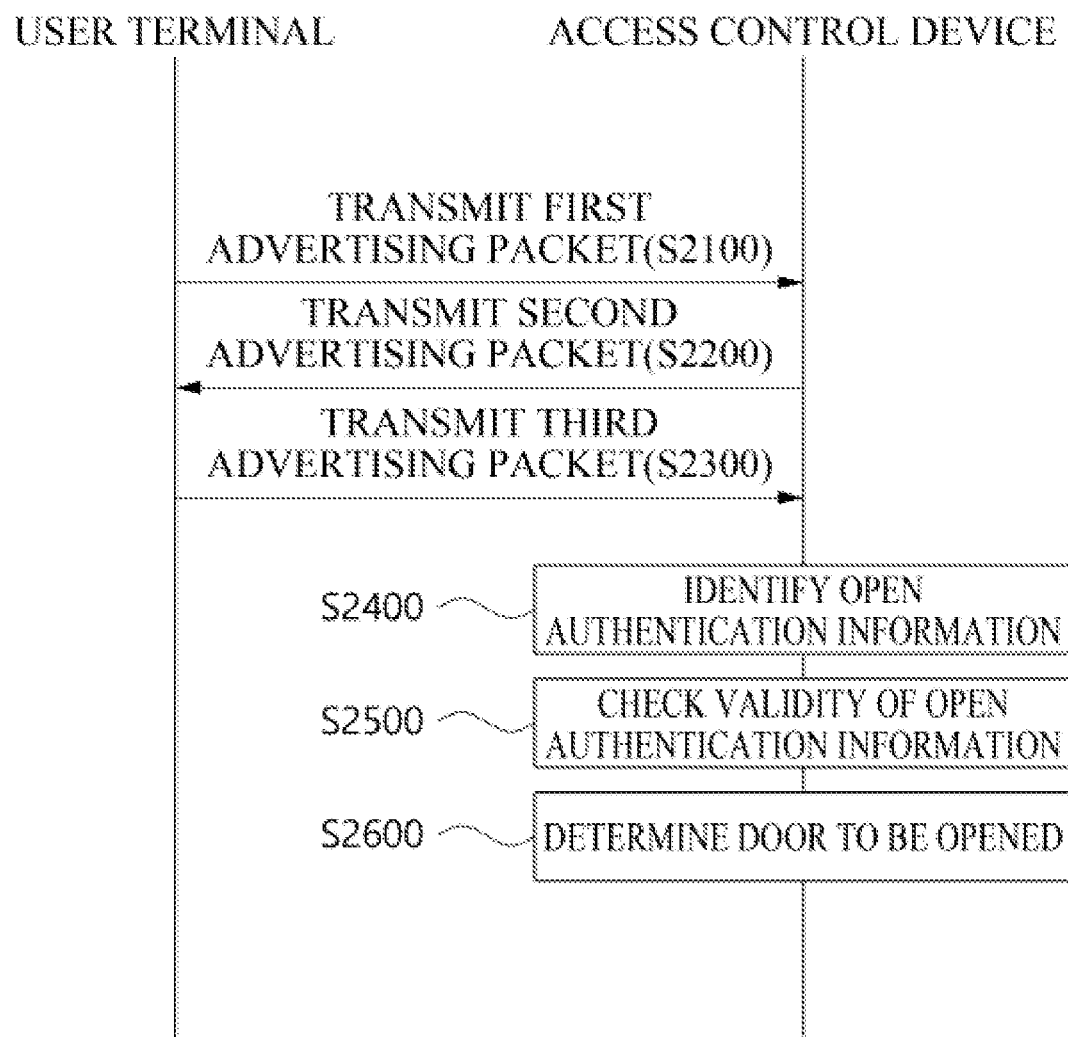
FIG. 10 is a diagram for describing an operation of an access management system (10000) that performs authentication on a user terminal 1000 using an advertising packet according to an embodiment of the present application.

FIG. 10 is a diagram for describing an operation of an access management system 10000 that performs authentication on a user terminal 1000 using an advertising packet according to an embodiment of the present application.

The user terminal 1000 may transmit a first advertising packet to the access control device 2000 (S2100). The first advertising packet may be transmitted in a broadcast form. The access control device 2000, while switching a data transmission path to a first, second, or third frequency band, may transmit the first advertising packet in one of the first, second, and third frequency bands. For example, the first, second, and third frequency bands may be 2402 MHz, 2426 MHz, and 2480 MHz, respectively.

The first advertising packet may include a first random key. The first advertising packet may include identification information of the user terminal 1000. The first advertising packet may include at least one of a first random key and identification information of the user terminal 1000.

According to the embodiment of the present application, the identification information of the user terminal 1000 may be encrypted, and the first random key may be used for generating a key for decrypting the encrypted identification information of the user terminal 1000.

According to the embodiment of the present application, open authentication information to be described below may be encrypted, and the first random key may be used for generating a key for decrypting the encrypted open authentication information.

Referring to FIG. 8A, data included in a payload of the first advertising packet may not exceed 38 bytes. For example, the first random key and the identification information of the user terminal 1000 included in the first advertising packet may not exceed 38 bytes.

The access control device 2000 may perform scanning. The access control device 2000, while switching a data reception path to a first, second, or third frequency band, may receive the first advertising packet in one of the first, second, and third frequency bands. For example, the first, second, and third frequency bands may be 2402 MHz, 2426 MHz, and 2480 MHz, respectively.

According to the embodiment of the present application, when the first advertising packet includes open authentication information, the access control device 2000, upon receiving the first advertising packet, may immediately identify the open authentication information (S2400).

According to another embodiment of the present application, as shown in FIG. 10, the access control device 2000 that has received the first advertising packet may transmit a second advertising packet (S2200). For example, the second advertising packet may be in the form of a scan request.

According to the embodiment of the present application, the access control device 2000 may transmit the second advertising packet through a data transmission path through which the first advertising packet has been received.

The second advertising packet may include a second random key. The second advertising packet may include identification information of the access control device 2000.

The second advertising packet may include at least one of a second random key and identification information of the access control device 2000.

According to the embodiment of the present application, the identification information of the access control device 2000 may be encrypted, and the second random key may be used for generating a key for decrypting the encrypted identification information of the access control device 2000.

According to the embodiment of the present application, open authentication information to be described below may be encrypted, and the second random key may be used for generating a key for decrypting the encrypted open authentication information.

According to the embodiment of the present application, the second advertising packet may further include the first random key. The second advertising packet includes the first random key, the second random key, and the identification information of the access control device 2000, and the key for decrypting the encrypted open authentication information to be described below may be generated on the basis of the first random key and the second random key.

Referring to FIG. 8A, data included in a payload of the second advertising packet may not exceed 38 bytes. For example, the second random key and the identification information of the access control device 2000 included in the second advertising packet may not exceed 38 bytes. As another example, the first random key, the second random key, and the identification information of the access control device 2000 included in the second advertising packet may not exceed 38 bytes.

The user terminal 1000, upon receiving the second advertising packet from the access control device 2000, may transmit a third advertising packet (S2300). The user terminal 1000, upon receiving the second advertising packet from the access control device 2000, may transmit a third advertising packet to the access control device 2000 (S2300). For example, the second advertising packet may be in the form of a scan response.

According to the embodiment of the present application, the user terminal 1000 may transmit the third advertising packet through a data transmission path through which the second advertising packet has been received.

The third advertising packet may include a third random key. The third advertising packet may include open authentication information. The third advertising packet may include at least one of a third random key and open authentication information.

The open authentication information may include information provided to open the door. For example, the open authentication information may include at least one of user identification information, identification information of the user terminal 1000, a PIN, and a password.

According to the embodiment of the present application, the open authentication information may be encrypted, and the third random key may be used for generating a key for decrypting the encrypted open authentication information.

According to the embodiment of the present application, the third advertising packet may further include the first random key. The third advertising packet may further include the second random key. The third advertising packet may include the first random key, the second random key, the third random key, and the open authentication information, and the key for decrypting the encrypted open authentication information may be generated on the basis of at least one of the first random key, the second random key, and the third random key.

Referring to FIG. 8A, data included in a payload of the third advertising packet may not exceed 38 bytes. For example, the third random key and the open authentication information included in the third advertising packet may not exceed 38 bytes. As another example, the first random key, the second random key, the third random key, and the open authentication information included in the third advertising packet may not exceed 38 bytes.

The access control device 2000, upon receiving the third advertising packet including the open authentication information from the user terminal 1000, may identify the open authentication information (S2300).

The access control device 2000 may generate the key for decrypting the open authentication information on the basis of at least the third random key. According to the embodiment of the present application, the access control device 2000 may generate the key for decrypting the open authentication information on the basis of the third random key. According to the embodiment of the present application, the access control device 2000 may generate the key for decrypting the open authentication information on the basis of the first random key and the third random key. According to the embodiment of the present application, the access control device 2000 may generate the key for decrypting the open authentication information on the basis of the second random key and the third random key. According to the embodiment of the present application, the access control device 2000 may generate the key for decrypting the open authentication information on the basis of the first random key, the second random key, and the third random key.

In the case of an embodiment of generating the key for decrypting the open authentication information on the basis of the first random key, the second random key, and the third random key, an effect of strengthening security may be derived compared to a case of generating the key for decrypting the open authentication information on the basis of the third random key.

The access control device 2000 may identify the open authentication information on the basis of the generated key. In other words, the access control device 2000 may decrypt the open authentication information to read the open authentication information.

The access control device 2000 may check the validity of the open authentication information (S2500). The access control device 2000 may, upon checking the validity of the open authentication information, determine that the door is opened (S2600).

Operation S2500 may be performed similarly to operation S1400.

Operation S2600 may be performed similarly to operation S1500.

Therefore, detailed descriptions of opertions S2500 and S2600 will be omitted.

Even in the access management system 10000 according to the present embodiment, a connection may be established between the user terminal 1000 and the access control device 2000 after the transmission of the third advertising packet in S2300, as required. A detailed description thereof has also been described above and thus will be omitted.

According to another embodiment on FIG. 10, the user terminal 1000 may transmit a first advertising packet to the access control device 2000 (S2100). The first advertising packet may be transmitted in a broadcast format. The access control device 2000, while switching a data transmission path to a first, second, or third frequency band, may transmit the first advertising packet in one of the first, second, and third frequency bands. For example, the first, second, and third frequency bands may be 2402 MHz, 2426 MHz, and 2480 MHz, respectively.

The first advertising packet may include a request for a public key. The first advertising packet may include a request for receiving a public key from the access control device 2000. The request for the public key may be provided in the form of transmission of a first advertising packet in which predefined data (e.g., 11111111) is inserted into a specific field. Alternatively, the request for the public key may be provided in a form in which the user terminal 1000 transmits a first advertising packet including identification information of the user terminal 1000, and the access control device 2000 identifies the identification information included in the first advertising packet and then transmits a public key.

Referring to FIG. 8A, data included in a payload of the first advertising packet may not exceed 38 bytes. For example, information corresponding to the request for the public key included in the first advertising packet may not exceed 38 bytes.

The access control device 2000 may perform scanning. The access control device 2000, while switching the data reception path to a first, second, or third frequency band, may receive the first advertising packet in one of the first, second, and third frequency bands. For example, the first, second, and third frequency bands may be 2402 MHz, 2426 MHz, and 2480 MHz, respectively.

The access control device 2000 that has received the first advertising packet may transmit a second advertising packet (S2200). For example, the second advertising packet may be provided in the form of a scan request.

According to the embodiment of the present application, the access control device 2000 may transmit the second advertising packet through a data transmission path through which the first advertising packet has been received.

The second advertising packet may include a public key. The public key included in the second advertising packet may be a public key corresponding to a private key stored in the access control device 2000. Alternatively, the public key included in the second advertising packet may be a public key corresponding to a private key received by the access control device 2000 from the authentication server 3000.

Referring to FIG. 8A, data included in a payload of the second advertising packet may not exceed 38 bytes. For example, the public key included in the second advertising packet may not exceed 38 bytes.

The user terminal 1000, upon receiving the second advertising packet from the access control device 2000, may transmit a third advertising packet (S2300). The user terminal 1000, upon receiving the second advertising packet from the access control device 2000, may transmit a third advertising packet to the access control device 2000 (S2300). For example, the second advertising packet may be in the form of a scan response.

According to the embodiment of the present application, the user terminal 1000 may transmit the third advertising packet through the data transmission path through which the second advertising packet has been received.

The third advertising packet may include open authentication information encrypted with the received public key. The open authentication information may include information provided to open the door. For example, the open authentication information may include at least one of user identification information, identification information of the user terminal 1000, a PIN, and a password.

Referring to FIG. 8A, data included in a payload of the third advertising packet may not exceed 38 bytes. For example, the open authentication information encrypted with the public key and included in the third advertising packet may not exceed 38 bytes.

The access control device 2000, upon receiving the third advertising packet including the open authentication information from the user terminal 1000, may identify the open authentication information (S2300). The access control device 2000 may check the validity of the open authentication information (S2500). The access control device 2000 may determine that the door is opened when the validity of the open authentication information is checked (S2600).

According to the embodiment of the present application, the access control device 2000 may decrypt the open authentication information on the basis of the private key. The private key may be stored in the door storage unit 2500. Alternatively, the access control device 2000 may receive the private key from the authentication server 3000 and decrypt the open authentication information using the received private key.

According to the embodiment of the present application, the access control device 2000 may compare authentication information stored in the access control device 2000 with the open authentication information to check the validity of the open authentication information. The comparison procedure may be performed by the door control unit 2600.

According to the embodiment of the present application, the access control device 2000 may compare authentication information received from the authentication server 3000 with the open authentication information to check the validity of the open authentication information.

The authentication information may be information for checking the validity of the open authentication information. For example, the authentication information may include at least one of user identification information, identification information of the user terminal 1000, a PIN, and a password.

According to the embodiment of the present application, the access control device 2000 may determine the door to be opened (S2600). For example, the access control device 2000 may determine that the door is opened when the open authentication information received from the user terminal 2000 matches the authentication information received from the authentication server 3000. As another example, the access control device 2000 may determine that the door is opened when the open authentication information received from the user terminal 2000 matches the authentication information stored in the door storage unit 2500.

For another example, the access control device 2000 may determine whether to open or close the door by identifying the open authentication information (S2300). The access control device 2000 may check the validity of the open authentication information on the basis of whether the open authentication information is decrypted by the private key. In other words, when the third advertising packet is decrypted by the private key, the access control device 2000 may identify that the user terminal 1000 having transmitted the third advertising packet has a right to access the door associated with the access control device 2000, and determine that the door is opened.

Even in the access management system 10000 according to the present embodiment, a connection may be established between the user terminal 1000 and the access control device 2000 after the transmission of the third advertising packet in S2300 as required. A detailed description thereof has already been described above and thus will be omitted.

Figure 11:
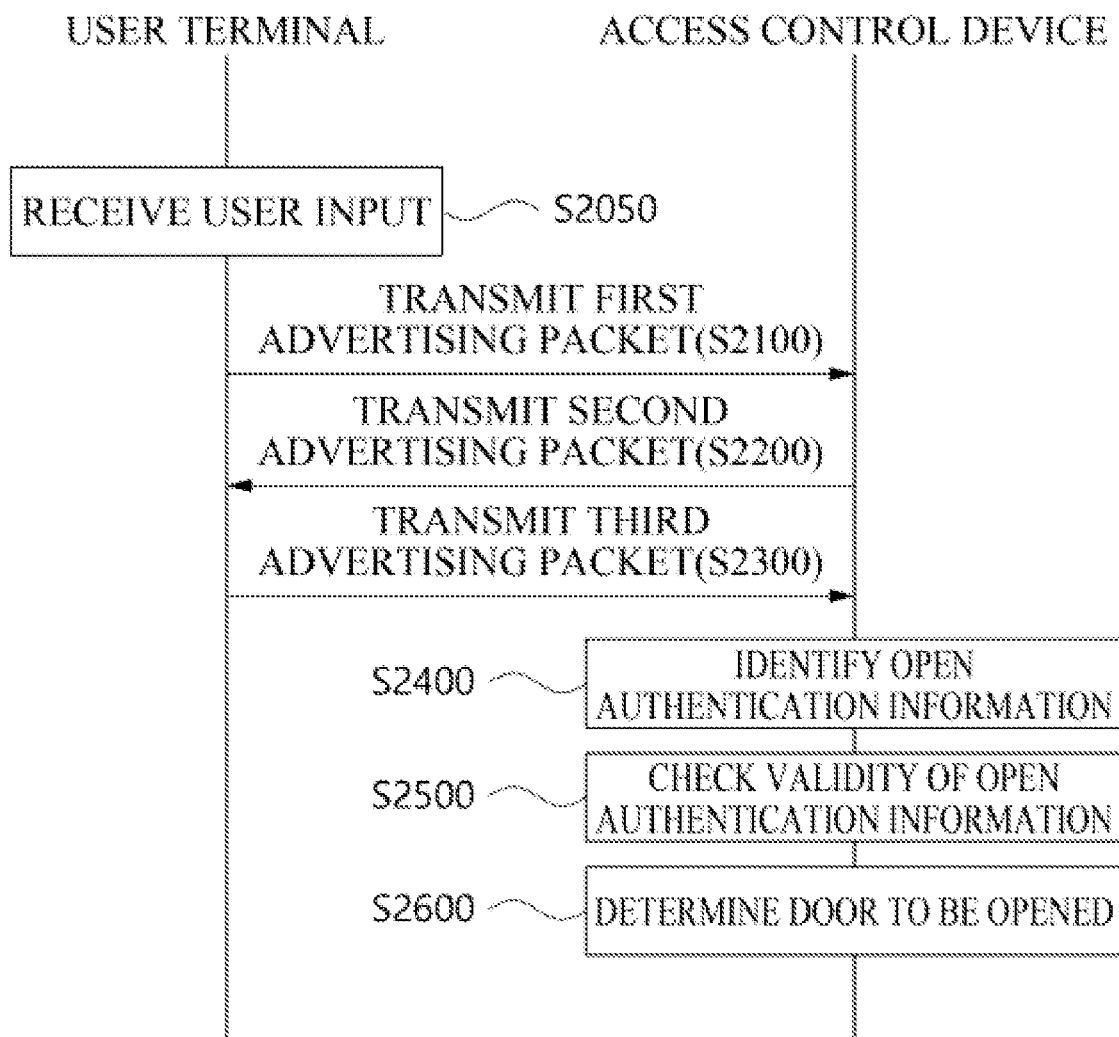
FIG. 11 is a diagram for describing an operation in which an advertising packet is transmitted according to a user input, which is input to a user terminal (1000), in an access management system (10000) according to an embodiment of the present application.

FIG. 11 is a diagram for describing an operation in which an advertising packet is transmitted according to a user input, which is input to the user terminal 1000, in an access management system 10000 according to an embodiment of the present application.

In a case in which the user terminal 1000 operates as an advertiser in the access management system 10000 disclosed by the present application, when an input for transmitting an advertising packet to the access control device 2000 is received from a user of the user terminal 1000 (S2050), a first advertising packet may be transmitted to the access control device 2000 according to the input of the user (S2100).

Subsequent to S2100, operations similar to those in the access management system 10000 described in FIG. 10 are performed, and thus redundant descriptions will be omitted.

Figure 12:
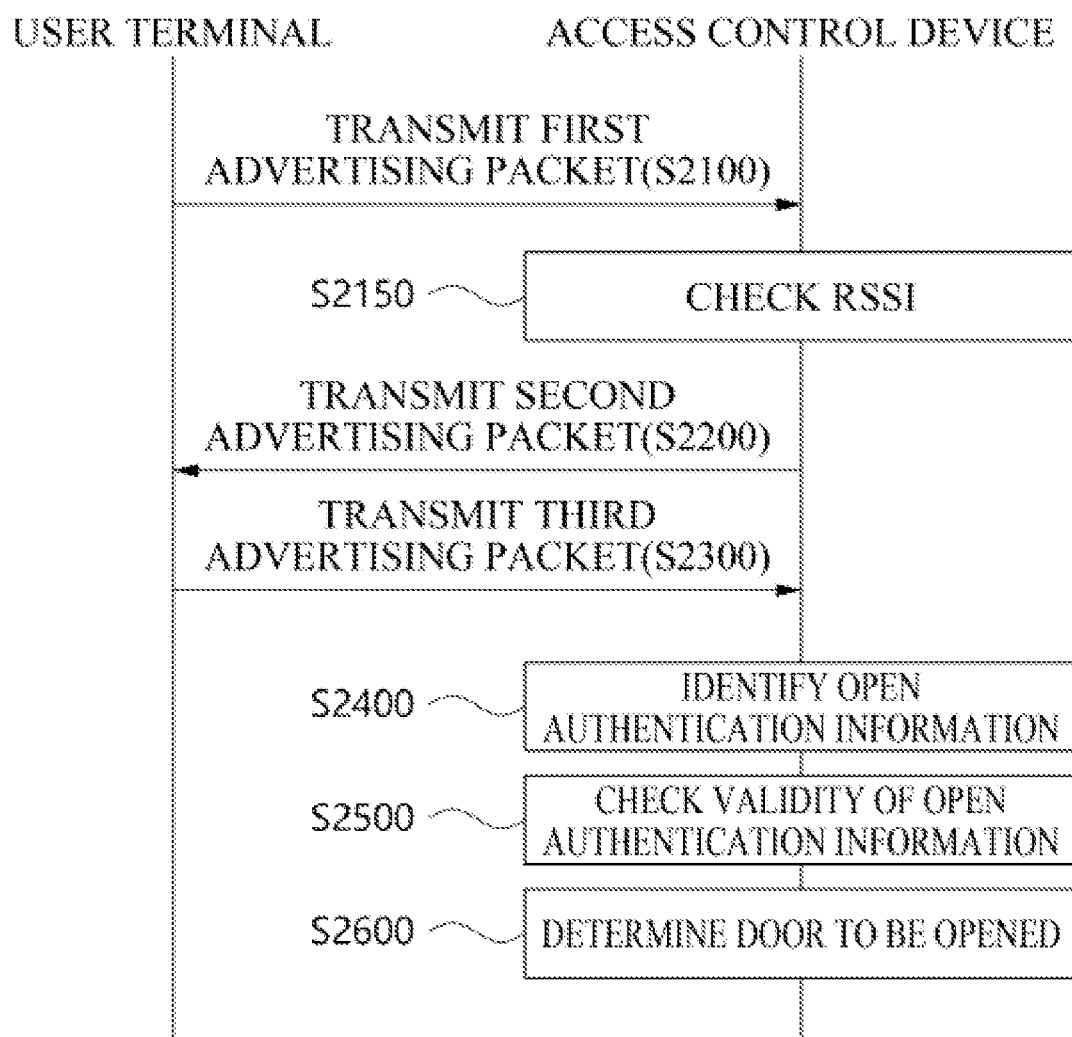
FIG. 12 is a diagram for describing an operation of an access management system (10000) according to the signal strength of an advertising packet received from a user terminal (1000) according to an embodiment of the present application.

FIG. 12 is a diagram for describing an operation of an access management system 10000 according to the signal strength of an advertising packet received from a user terminal 1000 according to an embodiment of the present application.

In a case in which the user terminal 1000 operates as an advertiser in the access management system 10000 disclosed by the present application, the user terminal 1000 may transmit first advertising packets at a preset time interval (S2100). The user terminal 1000 may broadcast the first advertising packets at a preset time interval.

The access control device 2000 may perform scanning. The access control device 2000 may receive the first advertising packet. The access control device 2000 may, upon receiving the first advertising packet, check a received signal strength indication (RSSI) (S2150).

The access control device 2000 may, when the strength of a signal with which the first advertising packet has been received exceeds a reference value, transmit a second advertising packet (S2200).

According to the embodiment of the present application, when the strength of the signal with which the first advertising packet has been received is less than the reference value, the access control device 2000 may not transmit the second advertising packet, and thus the key for decrypting open authentication information on the basis of the first random key, the second random key, and the third random key may not be generated.

Subsequent to operation S2200, operations are performed similarly to the operations in the access management system 10000 described in FIG. 10, and thus redundant description will be omitted.

According to the present application, a recording medium, on which a program for performing the operations according to the embodiments disclosed above may be recorded, may be provided. The recording medium may be implemented in the form of a Universal Serial Bus (USB) memory, an SSD, or an SD card having a physical structure or may be implemented in the form of a web drive having a virtual storage space through a server.

According to the present application, the user terminal 1000, the access control device 2000, and/or the authentication server 3000 for performing the operations according to the embodiments disclosed in the above may be provided.

Although the present invention has been described in detail above with reference to the exemplary embodiments, those of ordinary skill in the technical field to which the present invention pertains should be able to understand that various modifications and alterations may be made without departing from the technical spirit or essential features of the present invention. Therefore, such modifications or alternations come within the scope of the appended claims.

The invention claimed is:

1. An access control method of an access control device that authenticates access to a user terminal using an advertising packet, the access control method comprising:
transmitting the advertising packet to the user terminal, wherein the advertising packet includes a first public key and identification information of the access control device;
receiving a first packet from the user terminal, wherein the first packet includes variable information encrypted based on the first public key;
loading a first private key corresponding to the first public key;
decrypting the encrypted variable information using the first private key; and
determining whether to open a door or not based on the decrypted variable information,
wherein the transmitting the advertising packet to the user terminal and the receiving the first packet from the user terminal are performed before a communication channel is established through frequency synchronization between the user terminal and the access control device such that the access control device enables door opening control using data from the first packet received prior to the establishment of the communication channel.

2. The method of claim 1,
wherein the variable information is open authentication information.

3. The method of claim 2,
wherein the first packet includes a second public key, and
wherein the open authentication information is encrypted based on the first public key and a second private key, and
wherein the second private key corresponds to the second public key.

4. The method of claim 3,
wherein the decrypting the encrypted variable information is to decrypt the open authentication information using the first private key and the second public key.

5. The method of claim 1,
wherein the variable information is identification information of the access control device, and wherein the advertising packet includes the identification information of the access control device.

6. The method of claim 5,
wherein the first packet includes a second public key,
wherein the identification information of the access control device is encrypted based on the first public key and a second private key, and
wherein the second private key corresponds to the second public key.

7. The method of claim 6,
wherein the decrypting the encrypted variable information is to decrypt the identification information of the access control device using the first private key and the second public key.

8. The method of claim 1,
wherein the determining whether to open a door or not comprises determining whether to open a door or not by comparing authentication information stored in the access control device with the variable information.

9. The method of claim 1,
wherein the first private key is pre-obtained from a server that communicates with the access control device.

10. The method of claim 9,
wherein the determining whether to open a door or not comprises determining whether to open a door or not by comparing authentication information received from the server with the variable information.

11. The method of claim 8,
wherein the authentication information includes at least one of user identification information, user terminal identification information, a personal identification number (PIN), and a password.

12. The method of claim 1,
wherein the determining whether to open a door or not comprises determining to open a door when authentication information stored in the access control device matches the variable information.

13. The method of claim 1,
wherein the determining whether to open a door or not comprises determining whether to open a door or not based on whether the variable information is decrypted.

14. The method of claim 1,
wherein the identification information of the access control device is used for a generating of the encrypted variable information in the user terminal such that it is confirmed that the encrypted variable information is generated by the user terminal that has received the advertising packet.

15. A non-transitory computer-readable recording medium having recorded thereon a program for performing the method of claim 1.

16. An access control device that authenticates access to a user terminal using an advertising packet, the access control device comprising:
   a memory configured to store a first private key; and
   a controller operably connected to the memory, the controller being configured to:
   transmit the advertising packet to the user terminal, wherein the advertising packet includes a first public key and identification information of the access control device,
   receive a first packet from the user terminal, wherein the first packet includes variable information encrypted based on the first public key,
   load the first private key corresponding to the first public key from the memory,
   decrypt the encrypted variable information using the first private key, and
   determine whether to open a door or not based on the decrypted variable information,
   wherein the transmitting the advertising packet to the user terminal and the receiving the first packet from the user terminal are performed before a communication channel is established through frequency synchronization between the user terminal and the access control device such that the access control device enables door opening control using data from the first packet received prior to the establishment of the communication channel.

* * * * *